Nov. 12, 1968          H. J. ZURSTADT          3,410,141
GAS CHARGED REMOTE THERMOMETER
Filed Aug. 5, 1964
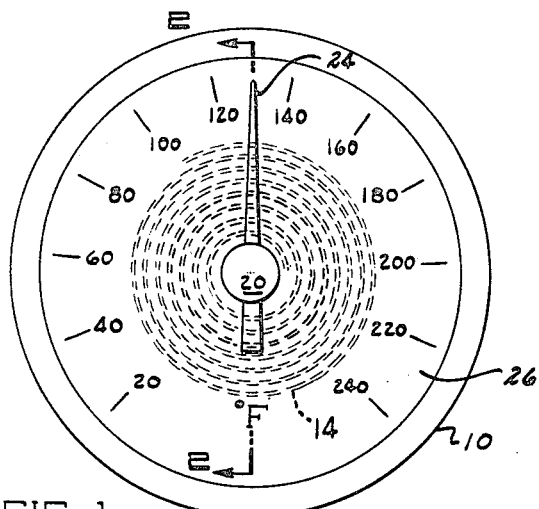
FIG_1
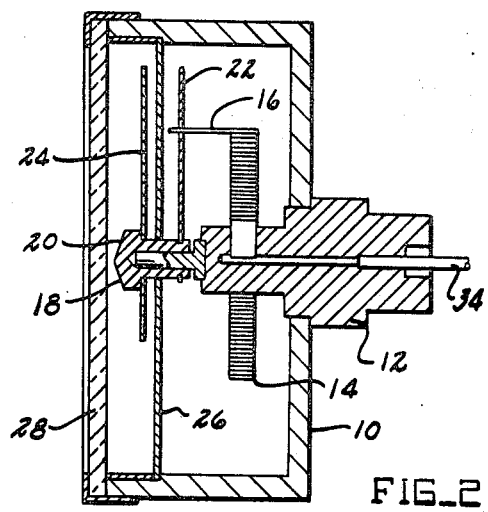
FIG_2
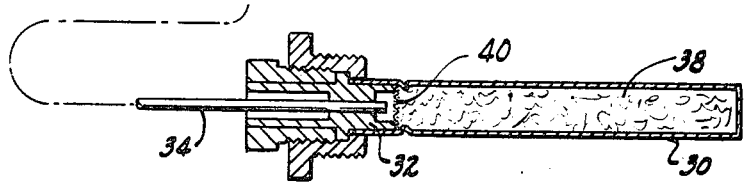
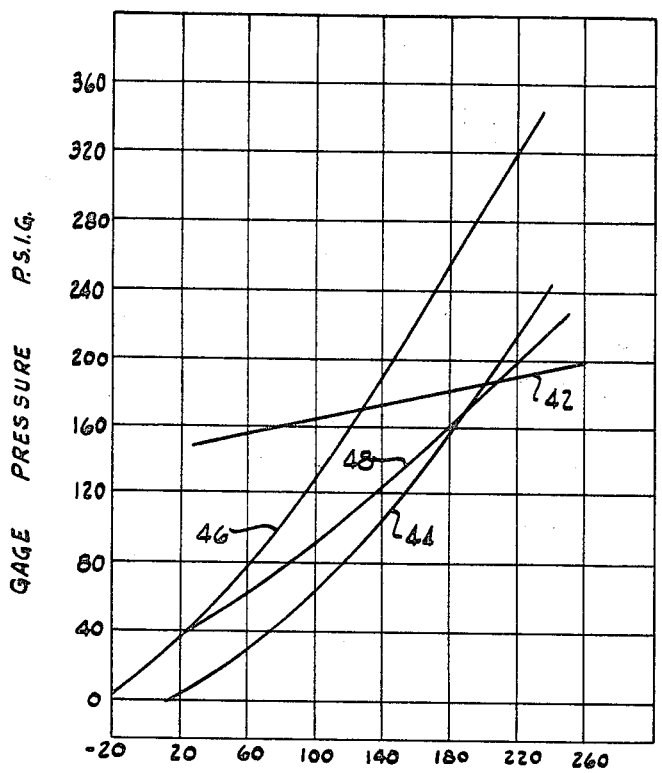
FIG_3
INVENTOR.
HERBERT J. ZURSTADT
BY
JOHN E. McRAE
ATTORNEY

United States Patent Office 3,410,141
Patented Nov. 12, 1968

3,410,141
GAS CHARGED REMOTE THERMOMETER
Herbert John Zurstadt, Grosse Pointe Park, Mich., assignor to American Standard Inc., a corporation of Delaware
Filed Aug. 5, 1964, Ser. No. 387,649
1 Claim. (Cl. 73—368.2)

ABSTRACT OF THE DISCLOSURE

A remote thermometer having a thermal bulb charged with an expansible gas, and gas-adsorbent material (e.g. charcoal) having the effect of adsorbing gas molecules onto its surface at low temperatures and releasing said gas molecules at higher temperatures, thereby causing the gas to have a steeper pressure-temperature curve than would otherwise be possible. A transducer (gas pressure to mechanical movement) is employed which comprises a multi-convolution Bourdon coil, and a gearless drive connection between the coil and temperature indicator (pointer). The coil is chosen to have a relatively small volume compared to the bulb volume so that temperature variations at the coil have little effect on the readout accuracy.

Background and summary

This invention relates to a remote temperature indicator comprising a gas-changed system having a temperature sensing bulb, capillary tubing, and pressure-operated tranducer.

In conventional temperature indicator systems the pressure or volume change which is applied to the transducer is a function primarily of the thermal expansion of the gas molecules or the liquid molecules in the sensing bulb. In the case of a gas filled system it is necessary that the bulb be extremely large in order to generate the necessary pressure to operate the transducer. Even when large bulbs are used, the capillary and transducer portions occupy a significant part of the system volume so that ambient temperature variations at the capillary and transducer materially adversely affect the transducer movement. Similar ambient compensation problems are encountered with other mechanical thermal systems, such as liquid expansion fills, where mercury or an organic liquid fill is used to drive the transducer. In order to compensate for temperature variations in the tubing transducer areas special ambient compensation mechanisms have been proposed.

To fully compensate for variations in transducer and capillary temperature it has been proposed to provide a second thermal system including a second transducer and second capillary; the elements in the second system are arranged adjacent to the corresponding elements in the operating system and are connected in opposition therewith to balance out thermal variations in the capillary and transducer areas. Partial compensation for variations in transducer temperature has been accomplished with a bimetal located to oppose the transducer action on the temperature indicator needle. Ambient compensation of the capillary tube is sometimes accomplished with a metal rod inside the capillary. Differential expansion of the two dissimilar metals maintains a volume which changes to nullify volume changes of the fill with temperature change.

It is an object of the present invention to provide a remote gas-charged thermometer which avoids the need for conventional compensating means or large bulb sizes.

Another object of the invention is to provide a remote gas-charged thermometer which provides a substantially linear movement of the transducer; i.e., substantially equal indicator movement per unit temperature change at all points within the range of the instrument.

A further object is to provide a remote gas-charged thermometer having a fairly large transducer movement per unit temperature change, whereby to permit accurate measurement of temperatures within narrow temperature ranges.

Additional objects of the invention are to provide a remote gas-charged thermometer which has comparatively small error due to variations in elevation, which maintains control at the bulb at all times, which has a rapid response time, and which can operate at elevated temperatures.

To accomplish the aforementioned objects I have devised a remote gas-charged thermometer in which the sensing bulb is pre-charged with a quantity of gas-absorbing material, preferably in granular or finely divided particle form. At relatively low temperatures the adsorbing material retains the gas molecules within its pores; upon temperature increase the gas molecules are released from the absorbing material to increase the pressure in the system and thus provide movement of the transducer. The system is distinguished from conventional gas-charged thermometer systems in that pressure is developed not only by thermal expansion of the individual gas molecules but also by an increase in the effective number of molecules in the system.

Preferably the proposed system is designed so that the bulb volume is larger than the total volume of the transducer and capillary, but much smaller than a conventional gas thermometer. The effective size of the bulb is greatly multiplied by the action of the adsorbing material. The adsorbing material is also beneficial in that it insures repeatability by stabilizing the system pressure at any given temperature exactly. In the proposed system the release of gas molecules from the adsorbent material is the predominating factor contributing toward pressure development; this factor in combination with the chosen bulb volume and transducer volume, insures that thermal gas expansion or contraction in the capillary tubing and transducer portions have little effect on the output pressure. It is thus possible to eliminate the compensation mechanisms heretofore proposed.

In the drawings

FIGURE 1 illustrates a remote thermometer having features of the invention incorporated therein; the view shows a thermometer dial in front elevation and a sensing bulb in cross section;

FIG. 2 is a sectional view taken on line 2—2 in FIG. 1;

FIG. 3 is a graph illustrating the performance of the FIG. 1 instrument.

There is shown in FIGS. 1 and 2 a thermometer comprising a cup-like casing 10 having a post-like fitting 12 for mounting a spiral Bourdon tube 14. The illustrated spiral Bourdon tube is provided with spiral convolutions radiating outwardly from post 12 and carrying an arm 16 which is preferably of yoke-like configuration. The Bourdon tube and its mounting post 12 constitute a rotary pressure transducer.

Fixedly secured atop post 12 is a shaft 18 which rotatably supports a hub 20, said hub having a radial rod-like arm 22 extending through the yoke member 16, whereby winding and unwinding movement of the spiral Bourdon tube produces rotary movement of arm 22 and hub 20. The hub carries a needle type indicator element 24 which overlies a fixed dial plate 26. Preferably the cup-like casing is provided with a transparent viewing glass 28.

It will be understood that winding and unwinding movement of Bourdon tube 14 is attained by development of varying pressures within the tube, and that the movement of needle 24 is proportional to the pressure change. The illustrated Bourdon tube is especially suited for temperature indication because of its substantially linear response to pressure change; i.e., each unit pressure change produces substantially the same arcuate deflection of the Bourdon tube.

To provide the variable pressure for operating the Bourdon tube there is provided a cylindrical thermal bulb 30 having a cap 32 suitably connected with one end of capillary tubing 34. The other end of capillary tubing 34 connects with the post-like fitting 12. The system defined by Bourdon tube 14, capillary tubing 34, and bulb 30 is charged with a suitable gas, as for example trifluoromonochloromethane, fluoromethane, nitrogen, argon, or carbon dioxide. The charging operation can be performed with a charging tube communicating with any point in the system, as for example cap 32, the right end of bulb 30, or post 12. The charging pressure and temperature are chosen so that the gas is in the superheat region during service.

Prior to the gas-charging operation bulb 30 is filled with a predetermined quantity of gas adsorbing granules 38. The granules can be formed of various different materials, as for example activated carbon, activated alumina, silica gel, or zeolites. Preferably the granular gas-adsorbing granules are retained within the bulb by a screen or filter element 40.

In service bulb 30 is positioned in an atmosphere subject to temperature change. At relatively low temperatures the gas-adsorbent material causes the gas molecules to be adsorbed on its pore surfaces, whereby a relatively small number of free gas molecules are in the system defined by bulb 30, capillary tubing 34, and Bourdon tube 14. As the temperature of bulb 30 is increased gas molecules are evolved from the granular adsorbent material, thereby increasing the number of free gas molecules and producing a substantial pressure increase in the system. The pressure increase results in an unwinding movement of the spiral Bourdon tube 14, with a consequent rotary movement of indicator element 24.

The movement of element 24 is proportional to the temperature change in bulb 30. A predominant factor in the pressure change is the reversible adsorption-evolution of gas molecules from the gas-adsorbing material; a minor factor is the thermal expansion and contraction of the free gas molecules.

FIG. 3 illustrates the pressure-temperature changes which occur in various gas-charged systems using relatively small size sensing bulbs. Curve 42 illustrates a system charged with trifluoromonochloromethane without gas adsorbent material 38. Curve 44 illustrates the same system precharged with a mass of granular gas-adsorbent carbon 38; in this case the charging was carried out at 120° F., and 80 p.s.i.g. Curve 46 illustrates the same system precharged with gas-adsorbent carbon 38 and subsequently charged with gas at −20° F., and 5 p.s.i.g. Each system uses a relatively small bulb having a volume of about .3 cubic inch. Curve 48 plots a slightly smaller volume system charged with charcoal and nitrogen.

It will be seen that with the curve 42 system the pressure change per unit temperature change is relatively small. This means that slight pressure variations due to temperature changes in the capillary and transducer can introduce a substantial error in the temperature reading when the relatively small bulb is used.

Curves 44, 46 and 48 represent systems wherein the pressure change per unit temperature change is relatively large. Therefore slight pressure variations due to thermal expansion or contraction in the capillary and transducer introduce only a minor error in the temperature reading at needle 24.

Preferably the volume of bulb 30 is substantially greater than the total volume of capillary 34 and Bourdon tube 14. For example, the bulb may have an internal diameter of about .33 inch and a length of about 3 inches, giving a bulb volume of about .27 cubic inch. Bourdon tube 14 may have a generally rectangular internal cross section measuring approximately .12 inch by .010 inch; a sufficient number of convolutions are provided to give an initial volume of about .038 cubic inch. Full scale deflection of about 270 angular degrees require a volume change in the Bourdon tube of about .005 cubic inch. The capillary tubing may have an internal volume of about .0006 cubic inch per linear foot; using a 50 foot length of capillary tubing would provide a total capillary volume of about .030 cubic inch. The total volume of the capillary and transducer therefore would amount to about .073 cubic inch, whereas the bulb volume is much larger, as for example .27 cubic inch.

The ratio of bulb volume to capillary-transducer volume is comparatively large, and the bulb volume in an absolute sense is smaller than that of bulbs in conventional gas charged system. For example, conventional gas-charged systems have used bulbs with diameters of ¾ inch and lengths of 10 inches, giving bulb volumes of about 4 cubic inch. The relatively small bulb volume in the present arrangement is made possible by the presence of the adsorbent particles 38 and the relatively small internal volume of the Bourdon tube which is employed. The presence of the adsorbent material in effect provides a multiplication in the bulb volume which is on the order of eight to ten times; i.e., the adsorbent in the bulb 30 increases the slope of the pressure-temperature curve of a conventional gas-charged bulb by a factor of eight to ten times.

I preferably use a multi-convolutional spiral Bourdon tube as the pressure transducer because of its small volume, its ability to unwind and produce a large scale needle deflection without intermediate gearing, its linear response to pressure change, and its shock and vibration resistance. It is contemplated that within the broader aspects of the invention other Bourdon tube configurations could be employed. In some cases diaphragms can be utilized as the pressure transducer, providing the volume in the transducer is sufficiently small. It will be realized in this connection that the necessity of a large volume in the transducer has the effect of decreasing the slope of the pressure-temperature curve, and to that extent interferes with the desirable response characteristics of the system.

The drawings show a remote temperature indicator wherein the indicating means takes the form of a needle 24 and dial 26. It is contemplated however that the indicating means could take other forms, as for example a slider-potentiometer arranged for electrical temperature indication.

What is claimed:

1. A remote thermometer comprising a hollow post; a multi-convolution spiral Bourdon tube radiating from said post and communicating with the hollow interior thereof, whereby to wind and unwind in response to internal pressure changes; a stationary shaft located in axial alignment with the post; a temperature indicator mounted for rotation on the shaft; means operatively connecting the Bourdon tube with the indicator in a one to one drive relationship whereby said indicator moves in accordance with the winding and unwinding movement of the tube; elongated capillary tubing connected with said hollow post for applying an operating pressure to the Bourdon tube; a thermal bulb connected with said capillary tubing remote from the Bourdon tube; a mass of gas-adsorbing material disposed in said bulb; and a gas charge occupying the system defined by the bulb, capillary tubing, and Bourdon tube; said gas-adsorbing material having the ability to reversibly adsorb and evolve gas molecules in response to temperature change, whereby pressure change is attained primarily by variation in the number of free gas molecules in the system; said bulb having a substantially greater volume than the total volume of the transducer and capillary tubing, whereby temperature variations in said transducer and capillary tubing are ineffective to materially affect the pressure produced by gas evolution within the bulb.

References Cited

UNITED STATES PATENTS

| | | | |
|---|---|---|---|
| 1,722,619 | 7/1929 | Ziegler | 73—368.6 |
| 2,426,663 | 9/1947 | Bevins | 73—368.2 |
| 2,787,130 | 4/1957 | Kaufman | 73—368.2 |
| 3,127,771 | 4/1964 | Diehl | 73—368.6 |
| 3,163,046 | 12/1964 | Huston | 73—368.6 |

LOUIS R. PRINCE, *Primary Examiner.*

W. A. HENRY II, *Assistant Examiner.*